(12) United States Patent
Dingeldein et al.

(10) Patent No.: US 6,227,569 B1
(45) Date of Patent: May 8, 2001

(54) STABILIZER MECHANICAL SUPPORT LINKAGE

(75) Inventors: William R. Dingeldein, Fayetteville, PA (US); John W. Golan, Bristol, CT (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/311,332

(22) Filed: May 13, 1999

(51) Int. Cl.⁷ ........................................................ B60S 9/10
(52) U.S. Cl. ........................................ 280/764.1; 212/304
(58) Field of Search .......................... 280/764.1, 765.1, 280/763.1; 212/304

(56) References Cited

U.S. PATENT DOCUMENTS

| | | | |
|---|---|---|---|
| 3,144,138 | * 8/1964 | Brown et al. | 212/304 |
| 4,026,428 | * 5/1977 | Shumaker | 280/765.1 |
| 4,082,197 | * 4/1978 | Stedman | 280/764.1 |
| 4,244,599 | * 1/1981 | Gauchet | 280/764.1 |

FOREIGN PATENT DOCUMENTS

| | | | |
|---|---|---|---|
| 36 26 989 | * 2/1988 | (DE) | 280/764.1 |
| 1465607 | * 1/1967 | (FR) | 280/764.1 |
| 308164 | * 7/1971 | (SU) | 280/764.1 |

* cited by examiner

Primary Examiner—Peter C. English
(74) Attorney, Agent, or Firm—Michael Best & Friedrich LLP (57) ABSTRACT

A system for supporting a vehicle frame, preferably of a forklift, on a base surface includes a pair of linkages attached to the frame. Each linkage includes a base link having a first end attached to the frame and a second end. A contact link is rotatably attached to the base link second end and has a contact surface engageable with the base surface. A drive link has a first end connected with the frame and a second end connected with the contact link. The drive link is configured to move the contact link in a first direction, such that the contact surface moves into engagement with the base surface, and alternatively in a second direction such that the contact surface moves generally away from the base surface. The drive link has a first portion connected with the frame and including the drive link first end and a second portion connected with the contact link and including the drive link second end. The second portion is movably connected with the first portion such that movement of the second portion with respect to the first portion displaces the contact link with respect to the frame. Preferably, the drive link is a hydraulic cylinder. The contact link preferably includes a stop portion engageable with the base link such that the base link and contact link move as a single unit for a particular range of linkage motion.

18 Claims, 8 Drawing Sheets

STABILIZER MECHANICAL SUPPORT LINKAGE

BACKGROUND OF THE INVENTION

The present invention relates to forklift machines, and more particularly to systems for supporting or stabilizing forklift machines.

Forklift machines or "forklifts" used to lift, transport and deposit loads are generally well known. A typical forklift machine generally comprises a chassis or frame, two pair of wheels mounted to axles attached to the frame and a lifting mechanism including a pair of movable arms or "forks". In use, an operator located in an operator cab maneuvers the vehicle to approach a load and engages the forks of the lift mechanism with the load, such as a pallet or crate of manufactured goods, a load of lumber or steel, etc. The lift mechanism raises the load and the forklift transports the load to a desired destination, where the load is then lowered and deposited.

One problem with forklift vehicles, particularly when lifting and/or transporting heavy loads on uneven terrain, is that the weight of the load may give rise to a moment about either the front pair of wheels and/or the right or left side pairs of wheels (e.g., the right side front and rear wheels) of the forklift. Such a moment, if not properly counteracted by moments arising from other forces, for example the weight of the forklift frame, may cause the forklift to "topple" over and lose the load. Therefore, support or stabilizing systems have been developed to counteract load-generated moments to prevent toppling of the forklift.

To prevent such toppling, systems have been developed whereby at least one and generally two stabilizing arms having an end contactable with the base surface at a location forward of the front pair of wheels. Generally, these systems are formed by a pair of arms, each arm having one end connected to the forklift machine and the other end being contactable with the base surface, and a pair of hydraulic cylinders each moving a separate connected arm. With such systems, the tendency of the load to tilt the vehicle forwardly about the front wheels causes the ends of the arms to press against the base surface, generating normal forces that, acting through the stabilizing arms, exert a moment directed oppositely the load moment. The moment exerted through the stabilizer arms (in combination with the moment generated by the weight of the forklift) is sufficient to prevent the forklift from toppling forwardly.

However, known stabilizing systems, such as those discusse above, have certain problems. With systems having stabilizer arms mounted to one of the vehicle axles, the axle must be reinforced to support stabilizer mechanism and the loads transmitted to the axle through the stabilizer arms. Further, as the stabilizer mechanisms are located beneath the forklift frame, the stabilizer system is both difficult to access for service purposes and have a limited range of vertical travel. Other systems having the arms connected to frame, the arms must generally be mounted proximal to the lateral sides of the frame so that the arms do not interfere with operator's field of vision when located in an upward storage position. Being mounted near the sides of the frame, the arms must be pivoted a relatively greater distance to cause a corresponding vertical displacement of the frame, thus requiring greater cylinder extension distances compared with axle-mounted cylinders.

It would therefore be desirable to have a system for supporting or stabilizing a forklift vehicle that overcomes the above-described drawbacks or limitations of the previously known support systems.

SUMMARY OF THE INVENTION

In one aspect, the present invention is a linkage for supporting a vehicle frame on a base surface. The linkage comprises a base link having a first end attached to the frame and a second end. A contact link is rotatably attached to the second end of the base link and has a contact surface engageable with the base surface. A drive link has a first end connected with the frame and a second end connected with the contact link. The drive link is configured to move the contact link in a first direction such that the contact surface is moveable into engagement with the base surface and alternatively in a second direction such that the contact surface moves generally away from the base surface.

In another aspect, the present invention is a system for supporting a vehicle frame on a base surface, the system comprising a pair of support linkages each connected with the frame. Each linkage includes a base link having a first end attached to the frame and a second end. A contact link is rotatably attached to the second end of the base link and has a contact surface engageable with the base surface. Each linkage is configured to move the contact link of the linkage in a first direction such that the contact surface is moveable into engagement with the base surface to support the frame above the base surface and alternatively in a second direction such that the contact surface moves generally away from the base surface.

In yet another aspect, the present invention is a linkage for positioning a body with respect to a base surface. The linkage comprises a base link having a first end attached to the body and a second end. A contact link is rotatably attached to the second end of the base link and has a contact surface engageable with the base surface. A drive link has a first end connected with the body and a second end connected with the contact link. The drive link is configured to rotate the contact link about the base link in a first direction such that the contact surface is moveable into engagement with the base surface and alternatively in a second direction such that the contact surface moves generally away from the base surface.

BRIEF DESCRIPTION OF THE SEVERAL VIEWS OF THE DRAWINGS

The description of the invention below will be better understood when read in conjunction with the appended drawings. For the purpose of illustrating the invention, there is shown in the drawings, which are diagrammatic, embodiments that are presently preferred. It should be understood, however, that the invention is not limited to the precise arrangements and instrumentalities shown. In the drawings.

DESCRIPTION OF THE INVENTION

Certain terminology is used in the following description for convenience only and is not limiting. The words "right", left", "lower", "upper", "upward", "down" and "downward" designate directions in the drawings to which reference is made. The words "front", "frontward" and "rear", "rearward" refer to directions toward and away from, respectively, a designated front section 2a of a forklift vehicle 1. The words "inner", "inward" and "outer", "outward" refer to directions toward and away from, respectively, a designated central axis 2b of the forklift vehicle 1. The terminology includes the words specifically mentioned above, derivatives thereof, and words of similar import.

Further, the word "link" as used in the present specification means any type of mechanical element, member or mechanism forming part of a linkage.

Referring now to the drawings in detail, wherein like numbers are used to indicate like elements throughout, there is shown in FIGS. 1–10 a presently preferred embodiment of system 10 for supporting the frame 2 of a vehicle 1 above a generally horizontal base surface 3. The support system 10 generally comprises at least one and preferably a pair of linkages 12 each connected with the frame 2, each linkage 12 including a base link 14, a contact link 16 and a drive link 18. The base link 14 has a first end 14a attached to the frame 2 and a second end 14b. The contact link 16 is rotatably attached to the second end 14b of the base link 14 and has a contact surface 20 engageable with the base surface 3. The drive link 18 has a first end 18a connected with the frame 2 and a second end 18b connected with the contact link 16. The drive link 18 is configured to move the contact link 16 in a first direction 22A such that the contact surface 20 is moveable into engagement with the base surface 3. The drive link 18 is also configured to alternatively move the contact link 16 in a second direction 22B such that the contact surface 20 moves generally away from the base surface 3. The linkages 12 support the frame 2 above the base surface 3 when the contact surfaces 20 are engaged with the base surface 3. Each of the above-recited elements are described in further detail below.

Figure 1:
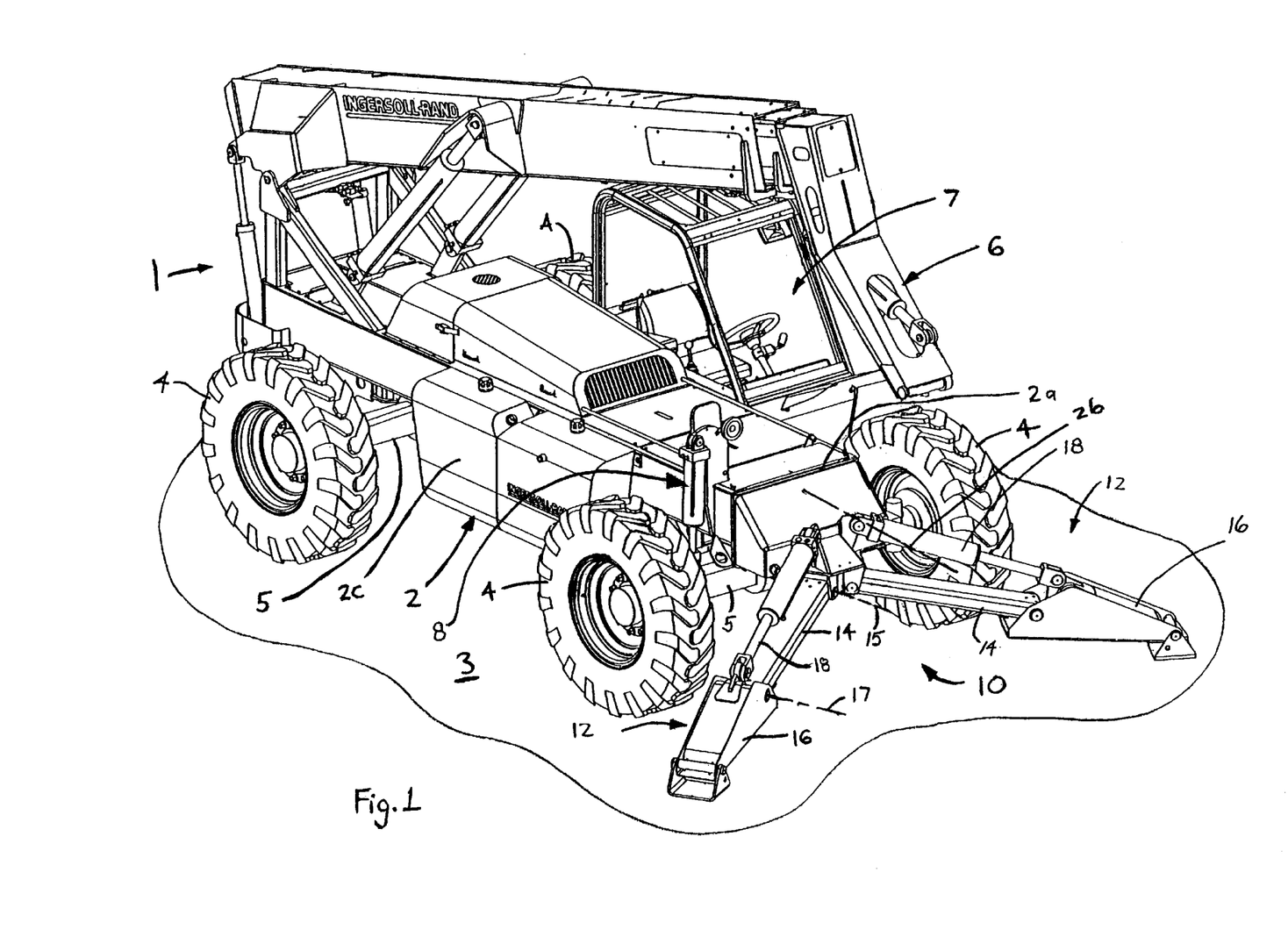
FIG. 1 is a front perspective view of a forklift having a support system in accordance with the present invention, the lifting mechanism shown without "forks"
Figure 2:
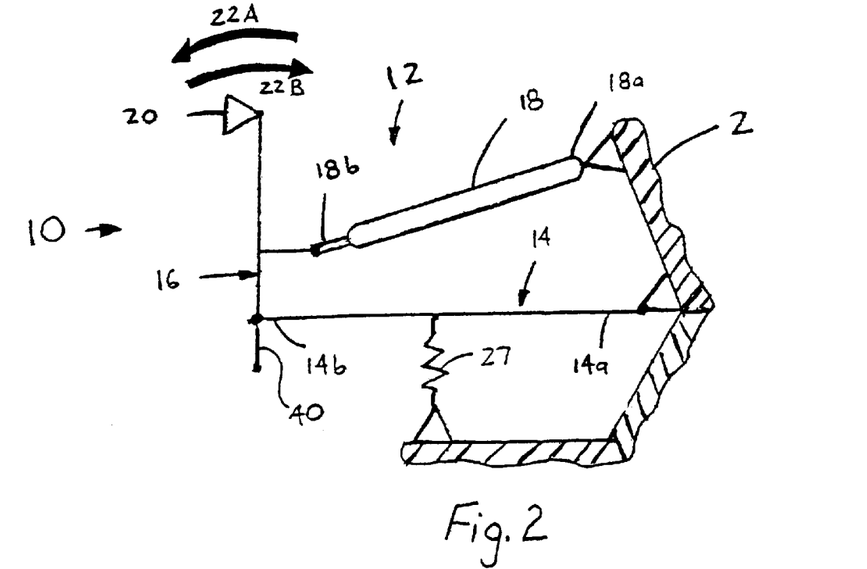
FIG. 2 is a more diagrammatic side view of one linkage of the support system of the present invention.
Figure 3:
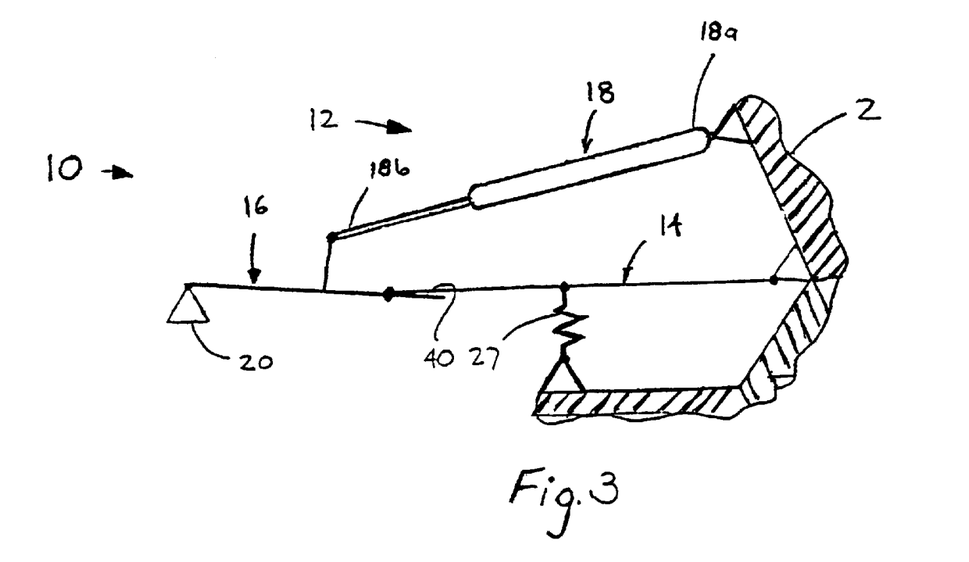
FIG. 3 is another view of the linkage of FIG. 2, showing the linkage in a second position.

Referring particularly to FIG. 1, the vehicle 1 is preferably a forklift machine 1 including the frame 2, two pairs of wheels 4, each wheel 4 being rotatably mounted to a separate axle 5 attached to the frame 2, an operator station 7 and a lifting mechanism 6. Preferably, the lifting mechanism 6 is an extendible and retractable telescopic "boom" as shown in FIG. 1, although the lifting mechanism 6 may alternatively be any other known type of lifting mechanism, such as for example a pair of forks slidably mounted on a vertical frame (not shown). Further, the forklift 1 preferably includes a frame leveling system 8 configured to position the frame 2 so as to be aligned or "leveled" with respect to the base surface 3.

Although it is preferred to use the support system 10 of the present invention with a forklift machine 1, is it within the scope of the present invention to incorporate the support system 10 of the present invention into any other desired type of construction vehicle, such as for example a backhoe or a front-end loader (neither shown), or even another type of vehicle for which stabilization or support may be desired, such as for example a fire-fighting vehicle. Further, the vehicle 1 may alternatively include, in addition to or in place of the wheels 4, one or more wheel trains each surrounded by and driving a continuous track or crawler (not shown).

Figure 4:
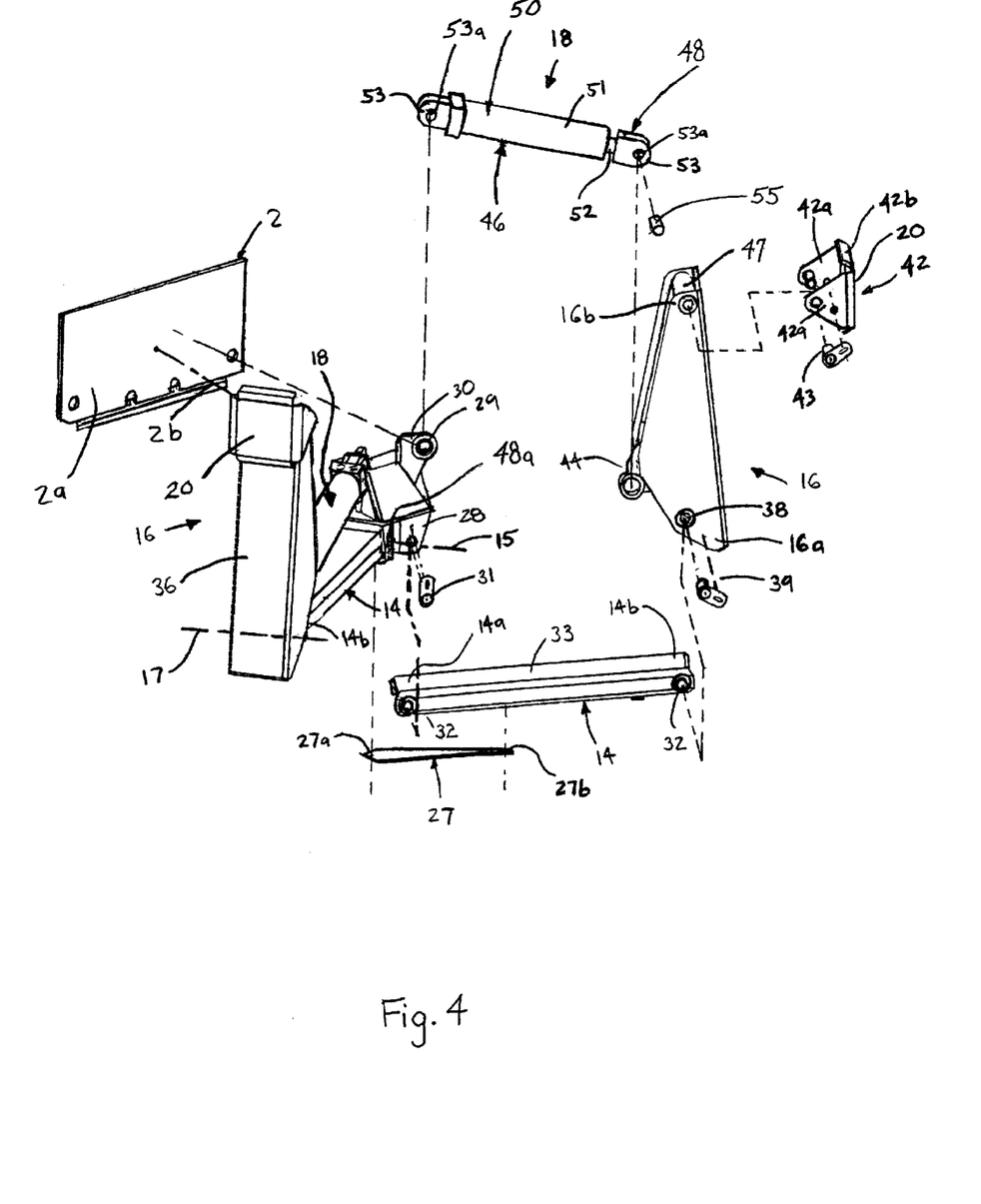
FIG. 4 is a front perspective view of the support system, showing one linkage exploded and one linkage assembled.
Figure 5:
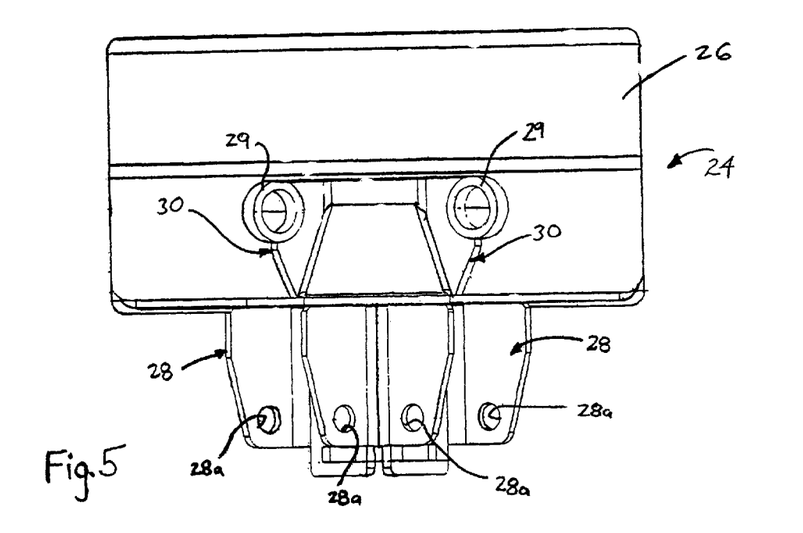
FIG. 5 is a front plan view of a base assembly.

Referring now to FIGS. 1, 4, 5 and 7–10, the support system 10 preferably includes a mounting assembly 24 attached to a front end 2a of the frame 2 so as to be generally centered about a central horizontal axis 2b (FIG. 4) through the frame 2. The mounting assembly 24 is used to connect the linkages 12 to the frame 2 as described further below. The mounting assembly 24 includes a body 26 formed by connected plates and removably attached to the front 2a of the frame 2 by means of threaded fasteners. Alternatively, the body 26 may be attached to the frame 2 by means of rivets, by welding or by any other appropriate means. A pair of "U-shaped" or "C-shaped" mounting brackets 28 are attached to the front of the body 26, each mounting bracket 28 including a pair of aligned bearing openings 28a (see FIG. 5). Further, a pair of mounting plates 30 are also attached to the body 26, each plate 30 being located above and proximal to a separate one of the mounting brackets 28 and including a bushing 29 (FIG. 5). Although the above structure of the mounting assembly 24 is preferred, it is within the scope of the present invention to construct the mounting assembly 24 in any other appropriate manner, or even to connect the linkages 12 directly to the frame 2, as long as the support system 10 is capable of functioning as described above and below.

Referring now to FIGS. 1–4 and 7–10, the base link 14 of each linkage 12 is preferably formed as a generally rectangular tube 33 having a bushing 32 disposed at each end 14a, 14b, as best shown in FIG. 4. The first end 14a of each base link 14 is rotatably attached to a separate one of the mounting brackets 28, preferably by means of a pin 31 extending through the aligned openings 28a of the bracket 28 and through the bushing 32 at the base link first end 14a. Each base link 14 is rotatable about a generally horizontal base link axis 15 on the frame 2 (see FIGS. 1 and 4), such that the base link 14 pivots alternatively upwardly and downwardly within a vertical plane generally perpendicular to the base surface 3. Alternatively, the base link 14 may also be movable or pivotable in a generally horizontal plane, such as for example if the mounting brackets 28 were pivotally attached to the mounting assembly 24.

Further, as the mounting brackets 28 are located proximal to each other on the mounting assembly 24, each base link 14 is attached the frame 2 at a point of attachment that is proximal to the point of attachment of the other link 14. The close proximity of the points of attachment of the base links 14 enables the linkages 12 to adjust or react to the movement of the frame 2 (i.e., as caused by the leveling system 8) in a manner similar to axle-mounted stabilizers (not shown).

Preferably, each linkage 12 further comprises a spring 27 having a first end 27a attached to the frame 2 and a second end 27b attached to the base link 14. The spring 27, which is preferably a flat spring, biases the base link 14, and thus the linkage 12, generally away from the base surface 3. The spring 27 acts against the weight of the linkage 12 so as to slow the rate of rotation of the base link 14 about the base link axis 15.

Figure 6:
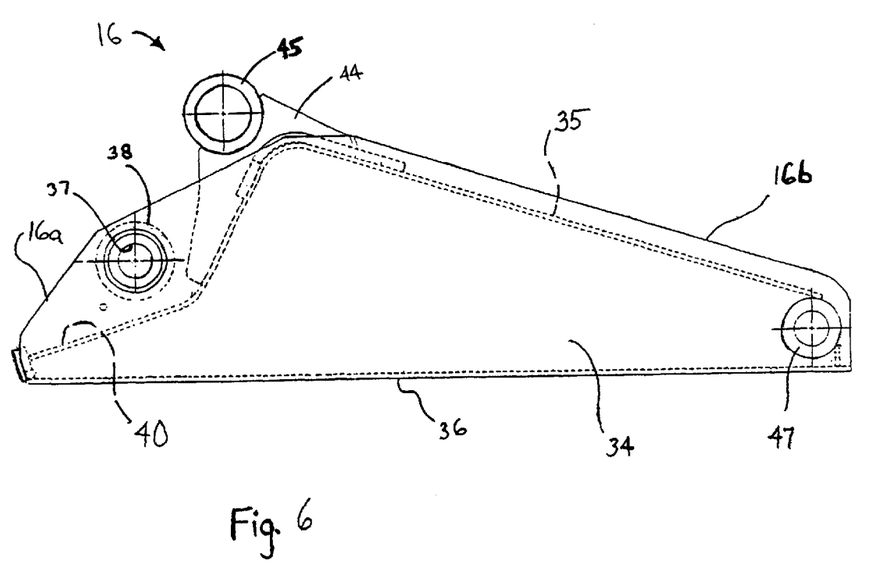
FIG. 6 is a side plan view of a contact link.

Referring to FIGS. 1–4 and 6–10, the contact link 16 is preferably a complex-shaped "box" formed of a pair of aligned side plates 34, an upper plate 35 and a lower plate 36, as best shown in FIG. 6. A pair of aligned openings 37 extend through the side plates 34 near the rear end 16a of the contact link 16 to provide an attachment portion 38. The attachment portion 38 is attached to the second end 14b of the base link 14, preferably by means of a pin 39 (see FIG. 4) extending through the aligned openings 37 and the bushing 32 at the base link second end 14b, so as to rotatably connect the contact link 16 to the base link 14. As best shown in FIG. 6, a rear section of the upper plate 35 extends beneath the openings 37 and provides a stop portion 40 that is contactable with the base link 14, the purpose of which is described below. The stop portion 40 is preferably an integral portion of the contact link 16 as depicted, although alternatively the stop portion may be provided by a separately attached member (not shown). The contact link 16 also includes a connector plate 44 attached to the upper plate 35 and including a bushing 45, to which is attached the second end 18b of the drive link 18, as discussed in further detail below.

Further, the contact link 16 has a front, free end 16b which provides the contact surface 20. Preferably, the contact link 16 includes a generally triangular pad member 42 rotatably attached to the free end 16b of the contact link 16 by means of a pin 43 extending through a bushing 47 located at the free end 16b of the contact link 16. Most preferably, the pad member 42 is formed of a plate bended into a "U" shape and having two triangular-shaped arms 42a and a central portion 42b with a lower surface providing the contact surface 20, as best shown in FIG. 4. Alternatively, the pad member 42 may be formed as a solid member and/or may have another appropriate shape. Further, the contact link 16 may even be formed without a separate pad member 42, such that contact surface 20 is provided by a portion of the free end 16b of the link 16.

Still referring to FIGS. 1–4 and 6–10, with the above-described structure, each contact link 16 is rotatable about a contact link axis 17 through the second end 14b of the base link 14 (FIGS. 1 and 4). In other words, the contact link 16 pivots alternatively downwardly in a first direction 22A and upwardly in a second direction 22B within a vertical plane generally perpendicular to the base surface 3. The range of rotation of the contact link 16 about the base link 14 in the first direction 22A is limited by contact/engagement of the stop portion 40 with the base link 14. More specifically, as the stop portion 40 and the contact surface 20 are disposed on opposing sides of the attachment portion 38, pivoting of the contact link 16 about the axis 17 to move the contact surface 20 downwardly causes the stop portion 40 to move upwardly into contact with the base link 14 (see FIG. 10), thereby preventing further relative movement of between the links 14, 16 in the second direction 22A.

When the stop portion 40 engages the base link 14 as described above, no further relative movement between the base link 14 and the contact link 16 is possible in the first direction 22A, such that the links 14, 16 are "soft-locked". When the contact link 16 and base link 14 are soft-locked, the links 14, 16 move as a single unit. In other words, movement of the contact link 16, by action of the drive link 18 as discussed below, when the stop portion 40 is so engaged causes the contact link 16 and the base link 14 to rotate about the frame 2 (i.e., about the base link axis 15) in the manner of a single "virtual" link (not shown) attached to the frame 2 and having a length equivalent to the two links 14, 16. Further, the contact link 16 may alternatively be movable or pivotable in a generally horizontal plane, such as for example, if the base link 14 and/or drive link 18 were pivotally attached to the frame 2 or the contact link 16 was in some manner capable of pivoting horizontally about the ends 14b, 18b of the links 14, 18, respectively.

Referring again to FIGS. 1–4 and 7–10, the drive or actuator link 18 includes a first portion 46 connected with the frame 2, which includes or provides the drive link first end 18a, and a second portion 48 connected with the contact link 16. The second portion 48 includes the drive link second end 18b and is movably connected with the first portion 46 such that the drive link 18 is alternatively extendible and retractable. Movement of the second portion 48 with respect to the first portion 46 displaces the contact link 16 with respect to the frame 2.

Referring specifically to FIG. 4., the drive link 18 is preferably a hydraulic cylinder 50, with the first portion 46 being the cylinder component 51 and the second portion 48 being the piston head (not shown) and the attached rod 52. Thus, movement of the second portion 48 of the drive link 18 is provided by extension and retraction of the rod 52 of the hydraulic cylinder 50. However, the drive link 18 may alternatively be configured as another appropriate type of link having first and second movably connected portions 46, 48, such as for example a solenoid, a rack-and-pinion mechanism or another linearly-movable mechanism, as long as the linkages 12 are capable of operating as described above and below.

Further, each drive link 18 preferably has a clevis 53 at the first end 18a with aligned openings 53a, such that the drive link 18 is rotatably attached to the frame 2 by means of a pin 55 extending through the openings 53a and the bushing 29 of one of the mounting plates 30. Thus, besides being extendible and retractable by movement of the second portion 48 with respect to the first portion 46, each drive link 18 is also rotatable with respect to the frame 2 in generally upwardly and downwardly directions. Preferably, each drive link 18 also has another clevis 53 with aligned openings 53a at the second end 18b, such that the drive link 18 is rotatably attached to the contact link 16 by means of another pin 55 extending through the openings 53a and the bushing 45 of the connector plate 44 of the associated contact link 16. However, although not preferred, either end 18a or 18b of the drive links 18 may be fixedly attached to the frame 2 (i.e., through the base assembly 24) or the contact link 16, respectively, and/or the ends 18a, 18b may be attached by any other appropriate means, such as for example by means of a single attached plate having an opening (not shown).

Figure 7:
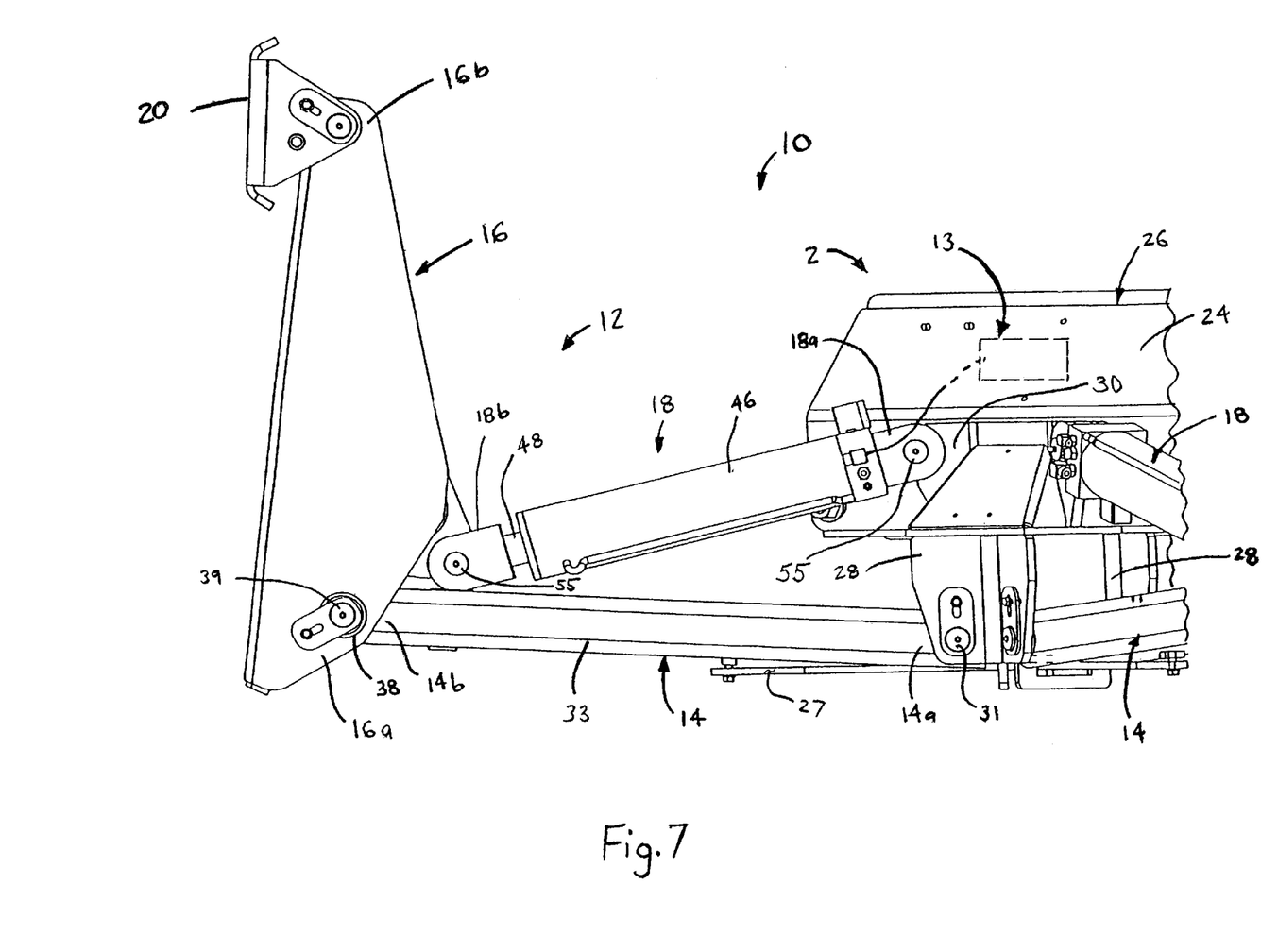
FIG. 7 is a broken-away, front elevational view of the support system showing one linkage in a storage position.
Figure 8:
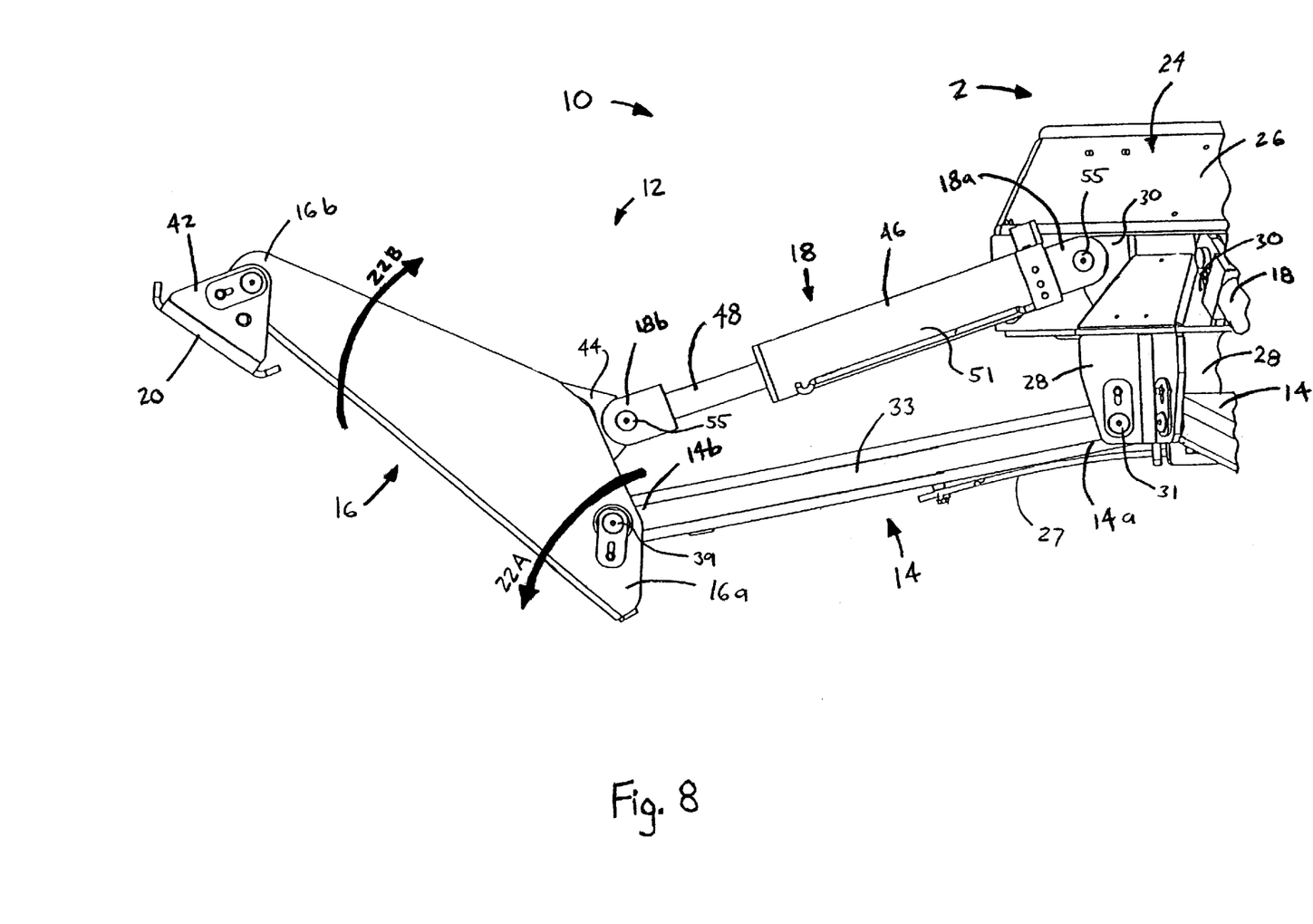
FIG. 8 is another view of the system of FIG. 7, showing the linkage in an intermediate position.

Referring specifically to FIG. 7, the support system 10 preferably includes a controller 13 (shown diagrammatically) for controlling the movement of each drive link 18, specifically displacement of the drive link second portion 48 with respect to the drive link first portion 46, so as to thereby control the movement of the associated linkage 12. Preferably, the controller 13 is configured to operate each linkage 12 independently of the other linkage 12. More specifically, the drive link 18 of one linkage 12 may be extended to deploy the linkage 12 while the drive link 18 of the other linkage 12 is retracted, both drive links 18 can be simultaneously extended or retracted, or one drive link 18 can be extended and/or retracted while the other drive link 18 remains at a fixed position. Further, the controller 13 preferably includes a hydraulic circuit with one or more electronically-actuated control valves (not shown) that are operated by means of one or more joysticks, levers or buttons (none shown) located in the operator station 7. Alternatively, the controller 13 may include any other appropriate elements, such as for example rotary potentiometers if the drive link 18 is actuated by an electric motor (neither shown).

Preferably, each base link 14 is formed from a tube of low carbon steel. The contact links 16 and the base assembly 24 are each preferably formed as a weldment of low carbon steel plates. Further, the drive links 18 are each preferably a Model Number 544017536CCCZ hydraulic cylinder produced by Texas Hydraulics of Temple, Tex. The spring 27 is preferably formed of spring steel. The other elements, such as the bushings, clevises, etc., are each preferably standard commercially available components. However, it is within the scope of the present invention to construct any or all of the elements/components of the support system 10 of another appropriate material and/or by using any other appropriate manufacturing technique. For example, the base link 14 may be formed as a solid bar, the contact link 16 may be formed of welded-together castings, the links 14, 16 may be made of alloy steel or aluminum, and/or the contact link 18 may be another model of hydraulic cylinder (or another type of mechanism, as discussed above). The selection of appropriate materials and manufacturing processes is well within the abilities of one skilled in the relevant art.

Referring now to FIGS. 7–10, with the above-described structure, the support system 10 of the present invention operates or functions in the manner described below. For purposes, of clarity, the operation is primarily described and depicted with reference to a single linkage 12, although both linkages 12 operate in a generally identical fashion.

When a linkage 12 is located in the upper (storage) position, movement of the drive link second portion 48 between a first or proximal position with respect to the drive link first portion 46 (FIG. 7) and a second or distal position with respect to the drive link first portion 46 (e.g., FIG. 10) causes the contact link 16 to rotate downwardly about the axis 17 through the second end 14b of the base link 14, and thus move generally toward the base surface 3. Simultaneously, the base link 14 rotates downwardly about the base link axis 15 on the frame 2, such that the base link 14 moves generally toward the base surface 3 against the upwardly-biasing action of the spring 27. The spring 27 acts to slow the downward rotation of the base link 14 so that the linkage 12 deploys through a desired path, but the linkage 12 is also capable of functioning adequately without the spring 27. Further, as the contact link 16 and base link 14 each rotate downwardly, the stop portion 40 of the contact link 16 moves toward and into contact with the base link 14.

Figure 9:
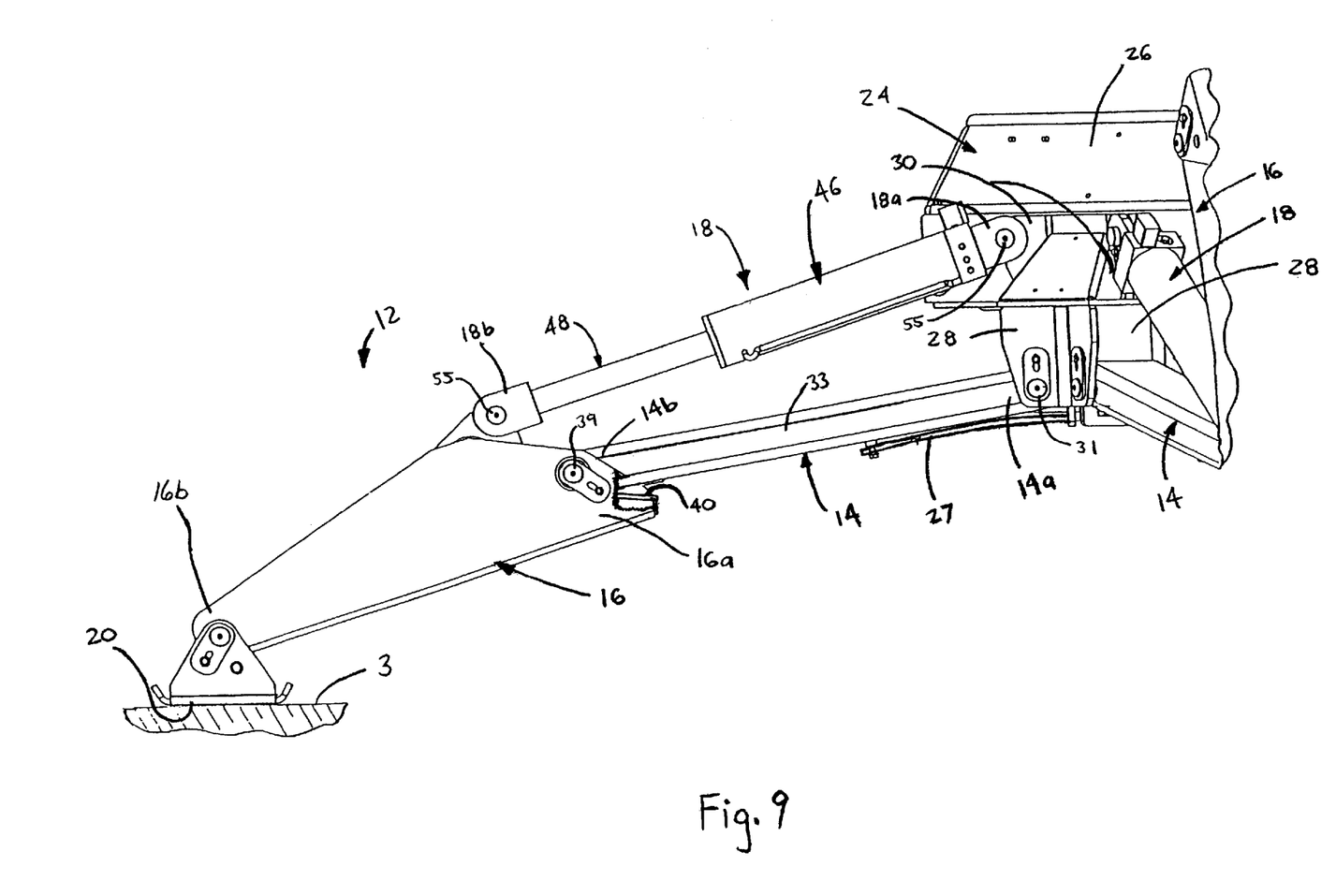
FIG. 9 is another view of the system of FIG. 7, showing a linkage contact surface engaged with the ground.
Figure 10:
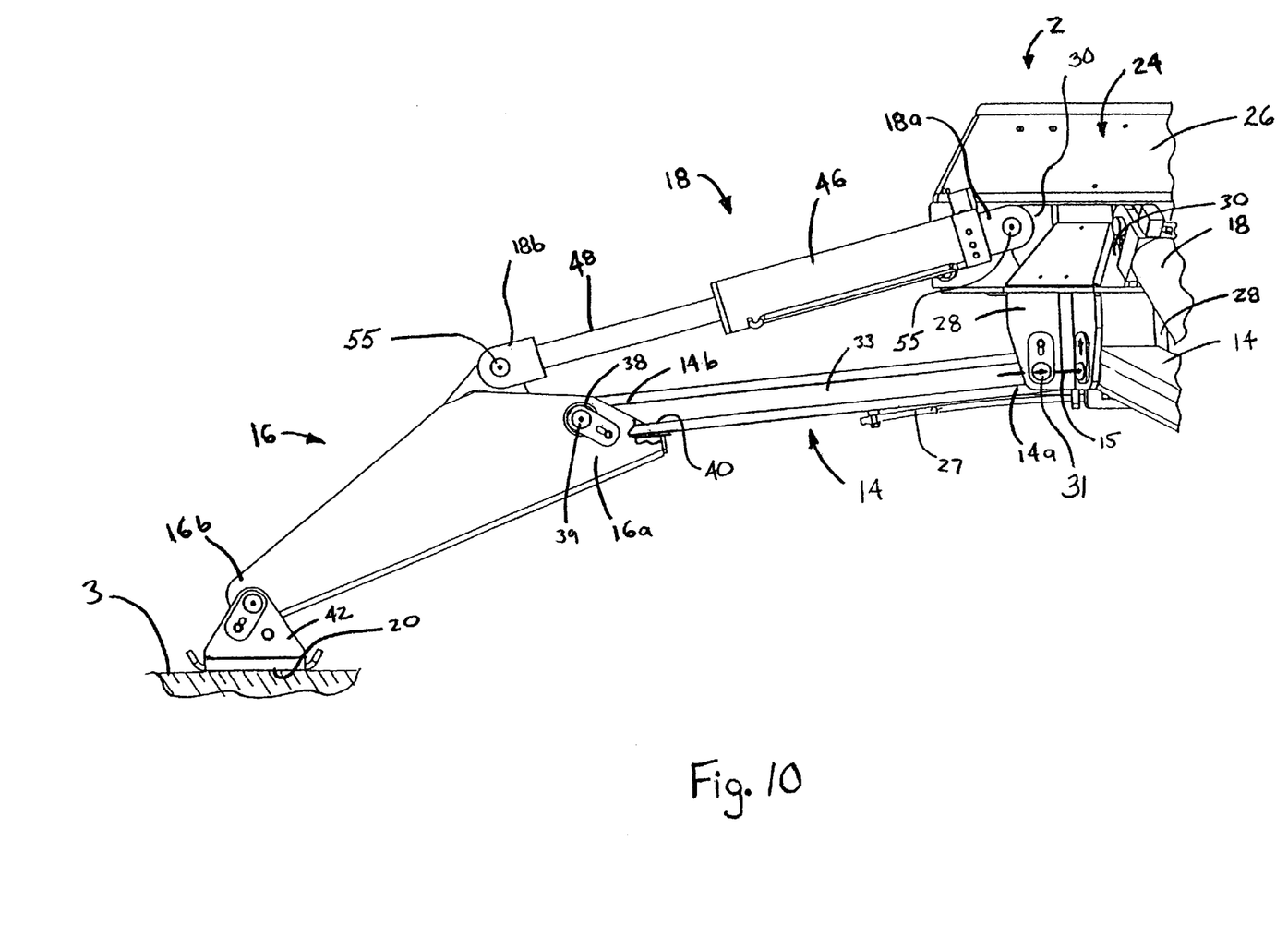
FIG. 10 is another view of the system of FIG. 9, showing a stop portion of the contact link engaged with a base link.

Generally, the contact surface 20 engages with the base surface 3 prior to the contact link stop portion 40 engaging with the base link 14, as shown in FIG. 9. Thus, further movement of the drive link second portion 48 does not cause the contact link 16 to displace linearly as the contact link free end 16b remains generally stationary on the base surface 3, but the contact link 16 continues rotating about the second end 14b of the base link 14 until the stop portion 40 engages with the base link 14, as shown in FIG. 10. Preferably, the linkages 12 are configured such that the base link 14 pivots upwardly a certain distance as the rear or upper end 16a of the contact link 16 moves upwardly and outwardly (i.e., away from the central axis 2b) with the contact surface 20 engaged with the base surface 3.

After the stop portion 40 engages with the base link 14, the two links 14, 16 both rotate about the base link axis 15 as a single unit, such that the displacement of the contact surface 20 with respect to the frame 2 is linearly proportional to the amount of displacement of the drive link second end 18b with respect to drive link first end 18b, in other words, to the extension of the hydraulic cylinder 50. The linearly proportional relationship simplifies the operation of the controller 13 for controlling the movement of the drive link 18, and thus the deployment and retraction of the linkage 12.

In general, movement of the drive link second portion 48 when the base and contact links 14, 16, respectively, are soft-locked increases the normal force exerted by each linkage 12 on the base surface 3. This increase in the normal force increases the stability of the frame 2 and also increases the desired reaction moment used to counteract the moment generated by the forklift load to prevent toppling of the forklift. Further, with an appropriate configuration of the linkages 12 and the control system 13, movement of the drive links 18 when the base and contact links 14, 16, respectively, are soft-locked may be used to move the vehicle frame 2 so as to either rotate the frame 2 for purposes of frame-leveling or to move the frame 2 upwardly and away from the base surface 3 such that the weight of the vehicle 1 is supported by the linkages 12 rather than the wheels 4 in the manner of an "outrigger".

Further, with the preferred structure of the linkages 12 as depicted in the drawings, the contact surface 20 must be in contact with the base surface 3 in order to maintain engagement between the stop portion 40 of the contact link 16 and the base link 14. However, the linkages 12 may be configured such that the base and contact links 14, 16, respectively, may move as a single unit even when the contact surface 20 is disposed above the base surface 3, such that the links 14, 16 displace vertically downwardly toward the base surface 3 in a linear proportion to the extension of the drive link 18.

Further, as described above, the support system 10 preferably includes two linkages 12 which are, due the arrangement of the mounting brackets 28 and mounting plates 30, disposed on opposing sides of the central axis 2b of the vehicle frame 2. Therefore, the support surface 20 of each contact link 16 is engageable with the base surface 3 on opposing sides of the central axis 2b. This arrangement of the contact surfaces 20 (i.e., being engaged on opposing sides of the central axis 2b) provides stability to both lateral sides 2c (only one shown) of the vehicle frame 2. Further, when both contact surfaces 20 are engaged with the base surface 3, the drive link 18 of one linkage 12 may be extended while the drive link 18 of the other linkage 12 is retracted by a corresponding amount so that the support system 10 is able to "react" to movement of the frame 2, such as caused by the frame leveling system 8, to ensure continuous stabilization of the frame 2.

Further, as described above, with the structure of the base assembly 24 being such that the attachment points of the two base links 14 are proximal to each other, the linkages 12 are able to move generally about the central axis 2b so as to follow the movement of the frame 2 as the frame 2 pivots about the center of the axles 5. Thus, the support system 10 is able to "shadow" the pivoting of the frame 2 in a manner similar to previously known support structures that are directly mounted to the axles 5 of the vehicle 1 (not shown).

As described above, the engagement of the contact surfaces 20 on opposing sides of the central axis 2b acts to prevent the vehicle frame 2 from toppling laterally about either the left-side or right-side pairs of wheels 4. Further, as the contact surfaces 20 are deployed frontwardly or forwardly of the front pair of wheels 4, the support system 10 also acts to prevent the forklift vehicle 1 from toppling forwardly. Therefore, the lift mechanism 6 may be used to "pick-up" or deposit a load (not shown) at an upper position of the mechanism 6, and particularly at a relatively high position with respect to the base surface 3, with a reduced risk of the forklift 1 toppling over.

After the lift mechanism 6 has picked-up or deposited the load at the upper position, the lift mechanism 6 is preferably lowered to a transport position. The linkages 12 are "retracted" to a storage position by retracting the cylinders 50 such that the drive link second portion 48 displaces toward the drive link first portion 46, causing the contact link 16 to rotate about the contact link axis 17 in the second direction 22B. The contact surface 20 disengages from the base surface 3 as the contact link 16 moves upwardly and generally away from the base surface 3 to the generally vertical storage position. Such movement of the contact link 16 causes the base link 14 to simultaneously pivot about the axis 15 (FIG. 4) on the frame 2 so as to move upwardly and generally away from the base surface 3. The upward movement of the base link 14 is assisted by the biasing action of the spring 27.

With the linkages 12 arranged in the storage position (FIG. 7), the forklift vehicle 1 may be driven to another location on the base surface 3 to deposit a load and/or pick-up another load. Further, when the linkages 12 are retracted, the configuration of the linkages 12 are such that the upper portions of the linkages 12 (i.e., the free ends 16b of the contact links 16) do not extend significantly vertically such that the operator has a generally clear field of vision. Also, in the retracted position, the outer edges of the contact links 16 are disposed within the outer lateral edges of the wheels 4, such that the linkages 12 do not interfere with the movement of the forklift vehicle 1.

It will be appreciated by those skilled in the art that changes could be made to the embodiments described above without departing from the broad inventive concept thereof. For example, although the present invention is described and depicted for use with a vehicle, one or more linkages 12 of the present invention may be used for positioning the body or frame of something other than a vehicle with respect to a surface or even another body (not depicted). It is understood, therefore, that this invention is not limited to the particular embodiments disclosed, but it is intended to cover modifications within the spirit and scope of the present invention as defined by the appended claims.

We claim:

1. A linkage for supporting a vehicle frame on a base surface, the linkage comprising:
    a base link having a first end rotatably attached to the frame and a second end;
    a contact link rotatably attached to the second end of the base link and having a contact surface engageable with the base surface; and
    a drive link having a first portion including a drive link first end connected with the frame and a second portion including a drive link second end connected with the contact link, the second portion being moveably connected with the first portion, the drive link being configured to move the contact link in a first direction such that the contact surface is moveable into engagement with the base surface and alternatively in a second direction such that the contact surface moves generally away from the base surface, wherein movement of the drive link second portion between a first position with respect to the drive link first portion and a second position with respect to the drive link first portion causes the contact link to rotate about the second end of the base link in the first direction, and movement of the drive link second portion between the second position and a third position with respect to the drive link first portion causes the base link and the contact link to rotate with respect to the frame as a single unit in the first direction.

2. The linkage as recited in claim 1 wherein the linkage supports the frame above the base surface when the contact surface is engaged with the base surface.

3. The linkage as recited in claim 1 wherein movement of the drive link second portion with respect to the drive link first portion when the contact surface is engaged with the base surface moves the frame with respect to the base surface.

4. The linkage as recited in claim 1 wherein the drive link is a hydraulic cylinder.

5. The linkage as recited in claim 1 wherein the contact link has:
    an attachment portion rotatably attached to the second end of the base link; and
    a stop portion contactable with the base link, the stop portion and the contact surface being disposed on opposing sides of the attachment portion such that movement of the contact link in the first direction causes the stop portion to move into contact with the base link.

6. The linkage as recited in claim 5 wherein the base link and the contact link move as a single unit when the stop portion is in contact with the base link.

7. The linkage as recited in claim 1 further comprising a spring having a first end attached to the frame and a second end attached to the base link and wherein the base link is rotatably attached to the frame such that the spring biases the linkage generally away from the base surface.

8. The linkage as recited in claim 1 wherein the contact link has a free end and a pad member rotatably attached to the free end and providing the contact surface.

9. A system for supporting a vehicle frame on a base surface, the system comprising a pair of support linkages each connected with the frame, each linkage including
    a base link having a first end rotatable attached to the frame and a second end,
    a contact link rotatably attached to the second end of the base link and having a contact surface engageable with the base surface,
    a drive link rotatably attached between the frame and the contact link, the drive link being configured to move the contact link in a first direction and alternatively in a second direction, and
    a spring having a first end attached to the frame and a second end attached to the base link such that the spring biases the linkage generally away from the base surface, wherein each linkage is configured to move the contact link of the linkage in the first direction such that the contact surface is moveable into engagement with the base surface and alternatively in the second direction such that the contact surface moves generally away from the base surface.

10. The system as recited in claim 9 wherein the drive link has a first end connected with the frame and a second end connected with the contact link and is configured to rotate the contact link about the base link.

11. The system as recited in claim 10 wherein the drive link includes a first portion connected with the frame and including the drive link first end, and a second portion connected with the contact link, including the drive link second end and movably connected with the first portion such that movement of the second portion with respect to the first portion displaces the contact link with respect to the frame.

12. The support system as recited in claim 9 wherein the frame has a central axis and each linkage is disposed on opposing sides of the central axis such that the contact surface of each contact link is engageable with the base surface on opposing sides of the central axis.

13. The support system as recited in claim 9 wherein each linkage is configured to move the contact link of each linkage when the contact surface is engaged with the base surface so as to move the frame with respect to the base surface.

14. A linkage for positioning a body with respect to a base surface, the linkage comprising:
- a base link having a first end attached to the body and a second end;
- a contact link rotatably attached to the second end of the base link, the contact link having a contact surface engageable with the base surface, an attachment portion rotatably attached to the second end of the base link, and a stop portion contactable with the base link; and
- a drive link having a first end connected with the body and a second end connected with the contact link and configured to rotate the contact link about the base link in a first direction such that the contact surface is moveable into engagement with the base surface and alternatively in a second direction such that the contact surface moves generally away from the base surface, wherein the stop portion and the contact surface are disposed on opposing sides of the attachment portion such that movement of the contact link in the first direction causes the stop portion to move into contact with the base link.

15. The linkage as recited in claim 14 wherein the drive link includes:
- a first portion providing the drive link first end; and
- a second portion providing the drive link second end and movably connected with the first portion such that movement of the second portion with respect to the first portion displaces the contact link with respect to the body.

16. A linkage for supporting a vehicle on a base surface comprising:
- a frame;
- a base link having a first end and a second end, the first end of the base link being rotatably connected to the frame;
- a contact link rotatably connected to the base link second end with the contact link having a contact surface rotatably mounted to the contact link and a stop portion; and
- a drive link having a first end and a second end, the drive link first end being rotatably connected to the frame and the drive link second end being rotatably mounted to the contact link, the drive link being extendable between a first position, an intermediate position, and second position, wherein the contact link and the base link rotate about the frame with relative rotation therebetween when the drive link is extended from the first position to the intermediate position where the stop portion on the contact link engages the base link, and the contact link and the base link rotate about the frame as a single unit without relative rotation therebetween when the drive link is extended from the intermediate position to the second position.

17. The linkage as recited in claim 16, wherein the contact link is rotatably connected to the base link second end about a contact link axis, and wherein the stop portion and the contact surface are located on opposing sides of the contact link axis.

18. The linkage as recited in claim 17, wherein the drive link second end is rotatably mounted to the contact link about a drive axis, the drive axis being located above the contact link axis in the first position, the intermediate position, and the second position.

* * * * *